United States Patent [19]

Mazziotti

[11] Patent Number: 4,861,315

[45] Date of Patent: Aug. 29, 1989

[54] FLEXIBLE INTERNAL UNIVERSAL JOINT SEAL

[75] Inventor: Philip J. Mazziotti, Toledo, Ohio

[73] Assignee: The Zeller Corporation, Defiance, Ohio

[21] Appl. No.: 177,155

[22] Filed: Apr. 4, 1988

Related U.S. Application Data

[63] Continuation-in-part of Ser. No. 37,045, Apr. 10, 1987, abandoned.

[51] Int. Cl.$^4$ .......................... F16J 15/32; F16D 3/26
[52] U.S. Cl. ...................................... 464/131; 277/84; 277/152; 384/481; 384/486; 464/14
[58] Field of Search ................ 277/84, 95, 152, 207 R; 384/481, 482, 484, 485, 486; 464/14, 128, 131, 903

[56] References Cited

U.S. PATENT DOCUMENTS

| | | | |
|---|---|---|---|
| 2,836,450 | 5/1958 | Riesing | 277/152 |
| 3,341,212 | 9/1967 | Bagnard et al. | 277/152 X |
| 4,116,019 | 9/1978 | Welschof | 464/14 X |
| 4,440,401 | 4/1984 | Olschewski et al. | 464/131 X |
| 4,530,675 | 7/1985 | Mazziotti | 464/131 |
| 4,653,936 | 3/1987 | Olschewski et al. | 384/481 X |

FOREIGN PATENT DOCUMENTS

| | | | |
|---|---|---|---|
| 2708137 | 6/1978 | Fed. Rep. of Germany | 464/131 |
| 828232 | 2/1960 | United Kingdom | 464/14 |

Primary Examiner—Daniel P. Stodola
Attorney, Agent, or Firm—Allen D. Gutchess, Jr.

[57] ABSTRACT

A seal is for a universal joint of the type comprising a cross having trunnions with annular shoulders therearound and with a bearing cup for each of the trunnions with the bearing cup having an interior shoulder adjacent the open end thereof. The seal is substantially recessed within the bearing cup at the open end. The seal comprises a sealing member having a lip which engages a portion of the trunnion at the shoulder thereof and an oppositely extending lip which engages the shoulder of the bearing cup. The sealing member has additional lips extending inwardly and outwardly for engaging the trunnion and the bearing cup. The sealing member has a deep annular groove between the lip which engages the shoulder portion of the trunnion and the outwardly-extending lips, the groove opening outwardly away from the bearing cup. The latter lips can have discontinuities in the form of slits or notches extending generally radially from outer extremities toward base portions thereof. The groove is located closer to the outer lips than the inner lips to form the sealing member into a thick, sealing body and a much thinner, lubricant-escape flap.

13 Claims, 2 Drawing Sheets

FLEXIBLE INTERNAL UNIVERSAL JOINT SEAL

This application is a continuation-in-part of my application serial No. 037,045, filed on Apr. 10, 1987, and now abandoned.

This invention relates to a flexible internal universal joint seal which is more effective in accommodating wide tolerances and surface irregularities in the components of the universal joint.

Seals between crosses and bearing cups of universal joints must meet difficult conditions. Since there is relative rotational movement between the cross trunnions and the bearing cups, the seals have to provide the sealing function while encountering movement between the seals and the sealing surfaces of the cross and/or cups. The seals must also contain the lubricant in the cups between the inner surface thereof and the trunnions even during high rotational movement of the universal joint and when subject to torque during operation of the drive train in which the universal joint is located. At the same time, however, with universal joints having lubricant fittings so that the bearings can be periodically lubricated, the seals must enable some of the old lubricant to be flushed from the bearings during lubrication. In addition, the universal joint seals must be effective in preventing the ingress of water and contaminants which can quickly cause bearing failure, even in small amounts. Preferably, the seals also should not project beyond the peripheries of the bearing cups so as not to inhibit assembling of the cross and the cups along with the yokes of the universal joint. The internal position of the seals also protects them from physical damage.

The present invention provides an internal universal joint seal having multiple lips basically as shown in my U.S. Pat. No. 4,530,675, issued on July 23, 1985, and some of the references cited therein. The cross of the universal joint includes a body and four trunnions extending therefrom at mutually perpendicular angles, with the cross commonly having an annular shoulder at the juncture of the body and each trunnion. Each bearing cup of the universal joint with which the internal seal is used has an open end which receives one of the trunnions. The cup has a first cylindrical interior portion of one diameter adjacent the open end and a second cylindrical interior portion of a smaller diameter away from the open end, forming an annular internal shoulder between the portions and facing toward the open end.

The internal universal joint seal as shown in my aforesaid patent includes a resilient sealing member having multiple lips engaging the first cylindrical interior portion of the cup and also having multiple lips engaging the surface of the trunnion adjacent the cross body. The sealing member has an additional lip between the two sets of multiple lips engaging the internal shoulder of the cup and a second additional lip between the two sets of multiple lips engaging the body of the cross. Where the cross body has a relatively smooth shoulder adjacent the trunnion, the second additional lip forms an additional seal. Where there is no annular shoulder, the second lip engages the body directly to retain the resilient sealing member to place between the cup and the trunnion, along with the additional lip which engages the internal shoulder of the cup. The multiple lips engaging the trunnion are effective to prevent the ingress of water and contaminants and the outer set of lips engaging the first cylindrical interior portion of the cup also are particularly effective to enable the egress of lubricant from the cup during lubrication. This enables used lubricant to be flushed completely from the bearing cup, if desired.

Internal universal joint seals as discussed above have commonly been made of rubber. While such seals have functioned well, the internal seal in accordance with the invention is preferably made of a thermoplastic material. In the manufacture of thermoplastic seals, the flash and other scrap can be remelted and reused which represents a savings in the ultimate cost of the material from which the seals are made. Thermoplastic seals, however, tend to be less resilient than rubber ones. As such, the seals are less accommodating to dimensional variations in the universal joints and to eccentric or irregular surfaces therein. For example, dimensional variations between the cup and the trunnion of a universal joint can amount to 0.020 inch whether the universal joint be a large one or a small one. A thermoplastic seal in a large joint, having a trunnion with a three inch diameter, for example, can accommodate the aforesaid dimensional variation. However, when that same dimensional variation occurs is a smaller universal joint, with trunnions having a diameter of a half inch, for example, the smaller seals lack the ability to accommodate the large variations relative to its size.

To overcome the above problems, the universal joint seal in accordance with the invention has a deep annular groove therein between the additional lip which engages the internal shoulder area of the body of the cross and the outer multiple lips engaging the first cylindrical interior portion of the cup. The large annular groove also faces outwardly away from the associated bearing cup. With my new concept, the flexibility of the resilient sealing member is thereby increased so that the aforesaid additional lip can yield outwardly and the outer lips can yield inwardly to accommodate variations in dimensions of the universal joint components.

The large annular groove is located in the sealing member closer to the outer multiple lips than to the inner multiple lips. In this manner, the groove forms the sealing member into a thick, sealing body and a much thinner, lubricant-escape flap. The sealing body forms a complete seal by itself with the additional lips engaging the internal shoulder of the cup and the body of the cross and with the inner multiple lips engaging the trunnion. When the bearing cup is lubricated, excess lubricant can be directed outwardly and escape past the multiple outer lips which are located on the flap. At the same time the outer lips on the flap are effective to prevent contaminants from entering the bearing cup.

Also in some universal joints, the degree of eccentricity of the inner surface of the bearing cup and the outer surface of the trunnion may be sufficient to prevent the inner or outer lips of the sealing member from seating properly on the adjacent surfaces. To overcome this problem, the outer lips and, if desired, the inner ones of the sealing member can have peripheral discontinuities in the form of slits or notches therein which extend from the extremities of the lips toward the bases thereof. These impart flexibility to the lips to enable them to conform more effectively to the associated universal joint component surfaces and thereby achieve an effective seal even with irregularities or roughness therein. The discontinuities also enable the segments of the outer lips, in particular, to be more flexible to enable lubricant to pass more readily out of the cup. This reduces the possibility of the seals being forced out of the cups during lubrication, if the lubricant is forced into the cups under sudden high pressure. The discontinuities also act as vents for the lubricant under that condition.

It is, therefore, a principal object of the invention to provide an internal universal joint seal having improved sealing properties with a cross and cup of the universal joint.

Another object of the invention is to provide an internal universal joint seal capable of accommodating greater tolerance ranges or dimensional variations in the cross and cup of the universal joint.

A further object of the invention is to provide an internal universal joint seal capable of achieving greater sealing effectiveness with surfaces of the cross and cup of the universal joint when they have surface irregularities or eccentricities.

Yet another object of the invention is to provide an internal universal joint seal having multiple lips engaged with the cross and multiple lips engaged with the cup and with a deep annular, outwardly-facing groove to provide greater resiliency or yieldability for the seal.

Still another object of the invention is to provide an internal universal joint seal having inner multiple lips engaged with the cross and outer multiple lips engaged with the cup and with a deep annular, outwardly-facing groove located closer to the outer lips to form the seal into a thick, sealing body and an outer, thinner lubricant-escape flap.

Yet a further object of the invention is to provide an internal universal joint seal having multiple lips engaged with the cross and multiple lips engaged with the cup and with at least some of the lips having discontinuities therein in the form of slits or notches.

Many other objects and advantages of the invention will be apparent from the following detailed description of a preferred embodiment thereof, reference being made to the accompanying drawings in which.

Figure 1:
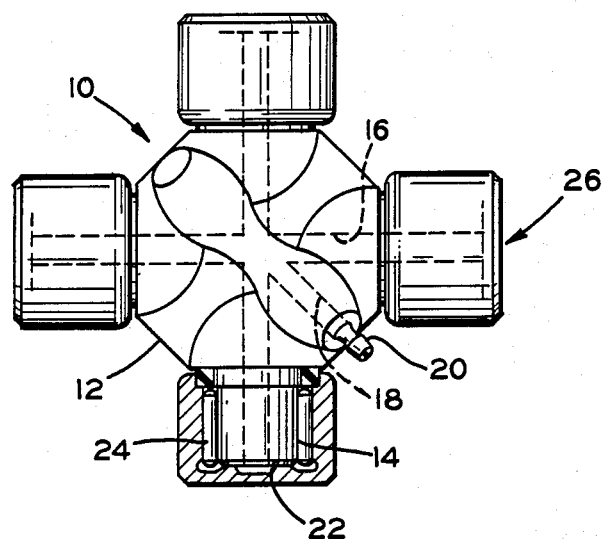
FIG. 1 is a view in elevation of a universal joint cross with bearing cups assembled therewith and with one bearing cup shown in cross section.
Figure 2:
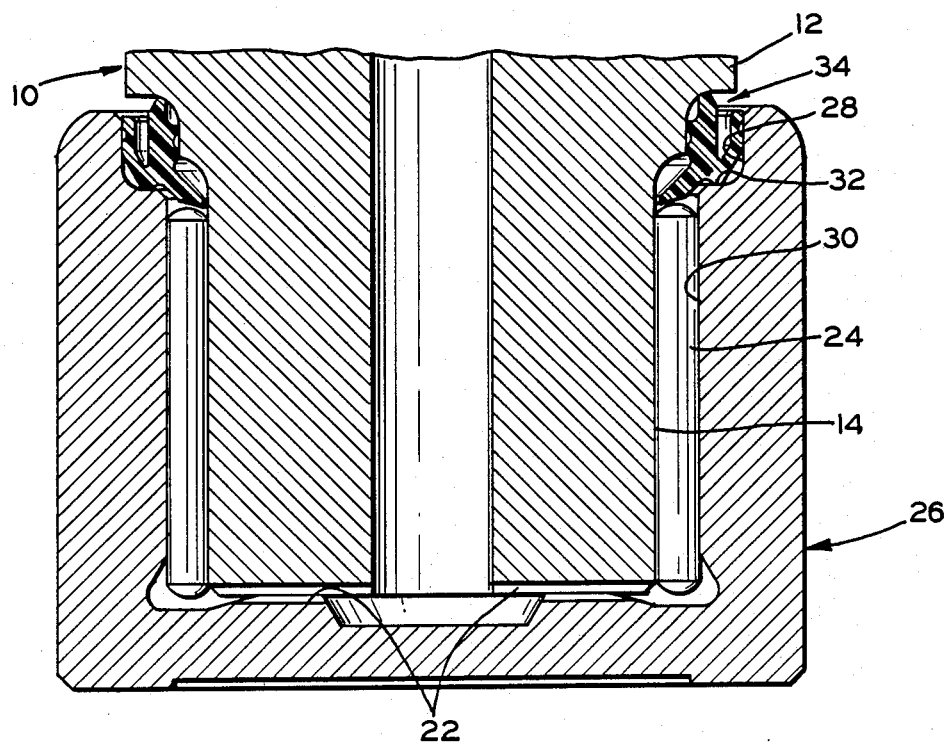
FIG. 2 is a greatly enlarged, fragmentary view in cross section of a cross body, a trunnion, and a bearing cup with a universal joint seal according to the invention in assembled relationship.

Referring to FIGS. 1 and 2, a universal joint includes a cross 10 having a body 12 from which extends trunnions 14. The body 12 and the trunnions 14 are provided with lubrication passages 16 which communicate with a supply passage 18 and a lubricant fitting 20. The passages 16 direct lubricant to the ends of the trunnions 14 which are provided with transverse passages or grooves 22 to supply the lubricant to needle bearings 24 located between the bearing cups 26 and the trunnions 14. The grooves 22 can also be located in the bottoms of the cups 26, in place of or in addition to those in the ends of the trunnions 14. With the lubrication system, the needle bearings 24 can be lubricated periodically to replace lubricant that has been lost or contaminated with foreign material, including water or wear particles and, therefore, extend the life of the universal joint.

Figure 3:
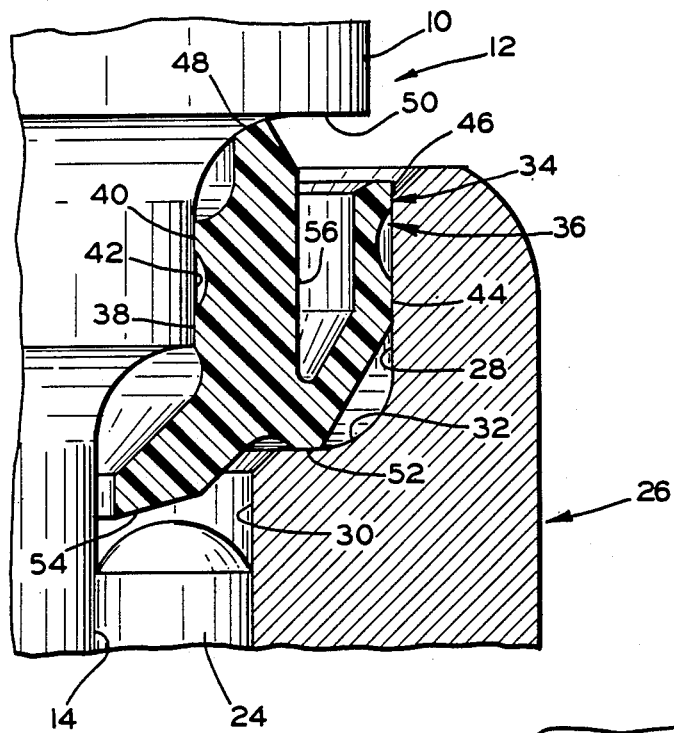
FIG. 3 is a further enlarged, fragmentary view in transverse cross section of the universal joint components and seal of FIG. 2.
Figure 4:
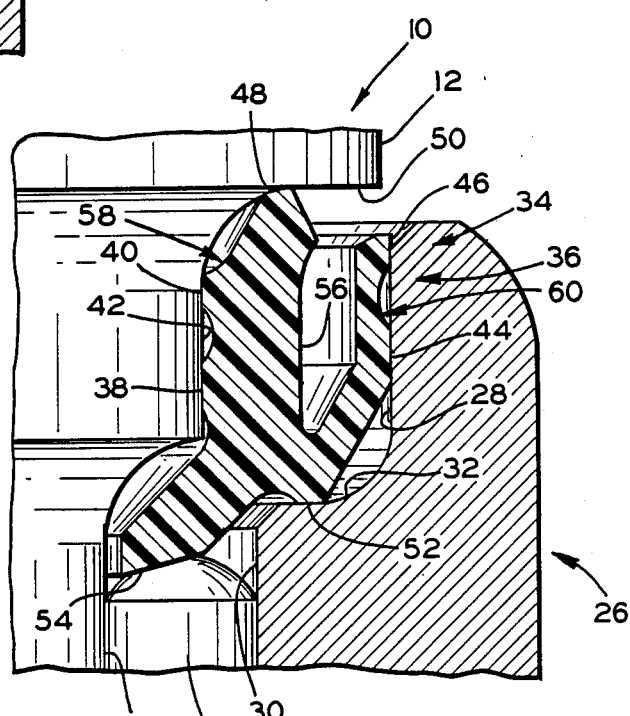
FIG. 4 is an enlarged, fragmentary view in transverse cross section similar to FIG. 3 but with the universal joint components having different transverse dimensions.

Referring particularly to FIGS. 2, 3, and 4, each of the bearing cups 26 has an open end to receive the trunnion 14 with the cup having a first cylindrical internal portion 28 of one diameter adjacent the open end and a second cylindrical internal portion 30 of smaller diameter away from the open end. An internal annular shoulder 32 is formed between the two portions 28 and 30 and faces the open end of the cup.

Most resilient sealing members heretofore formed between the cups and crosses of the universal joints commonly have been designed with contours conforming to the contours of the cross at the juncture of the body and trunnions and also with the contours of the open ends of the bearing cups. The purpose was to provide a large contact area which might be expected to provide better seals. However, the surfaces at the junctures of the cross body and trunnions and the contoured open ends of the bearing cups have not always been as smooth as other portions of the cross and cups. Such surfaces have had circular irregularities which have prevented effective seals with the sealing member, in some instances. Also, substantial abrasion has resulted to the resilient sealing member at times where relative movement occurs between the cross and/or cup and the sealing member.

The universal joint seal in accordance with my aforesaid U.S. Pat. No. 4,530,675, has sealing lips which engage relatively narrow bands of the cross cups and the cross trunnion. As such, narrow contact of the lips and the surfaces can provide substantial sealing effectiveness even if the surfaces are rough, irregular, or eccentric. With such seals made of rubber, the lips are sufficiently resilient to accommodate most universal joint surfaces. However, the universal joint seal in accordance with the invention is preferably made of a thermoplastic material, as discussed previously. The flash and other scrap of the thermoplastic material can be remelted and reused which saves in the ultimate cost of the material from which the seals are made. However, the thermoplastic seals tend to be less resilient than the rubber ones and the lips of the seals are less effective in sealing with components having dimensional variations and with eccentric or irregular surfaces.

A universal joint seal 34 in accordance with the invention provides a more effective seal for the annular space between the bearing cup and the cross. The seal 34 comprises a resilient sealing member 36 of a thermoplastic material which has at least two inwardly-extending circular lips 38 and 40 which engage the trunnion 14 near the cross body 12, in this instance at a surface of a larger diameter portion 42 near the body 12. The circular lips 38 and 40 are relatively narrow and engage the trunnion along narrow, annular areas to provide two seals between the sealing member 36 and the cross 10. The sealing member 36 also has at least two outwardly-extending circular lips 44 and 46 which engage the inner surface of the first cylindrical internal portion 28 of the bearing cup 26. These engage the bearing cup surface along narrow, annular areas to provide two seals between the sealing member 36 and the cup 26.

The sealing member 36 also has an upwardly-extending circular lip 48 between the inner lips 38, 40 and the outer lips 44, 46. The lip 48 engages the cross 10 at a portion of a shoulder 50, in this instance, between the cross body 12 and the trunnion 14. The lip 48 engages the cross along a narrow annular area to provide an additional seal between the sealing member 36 and the cross 10.

The sealing member 36 also has a downwardly-extending, circular lip 52 between the inner lips 38, 40 and the outer lips 44, 46. This lip 52 engages the internal shoulder 32 of the bearing cup 26 along a narrow, annular area to provide an additional seal between the sealing member 36 and the cup 26. The lips 48 and 52, through their engagements with the cross 10 and the cup 26, retain the seal 34 in proper sealing position.

All sealing lips inhibit the ingress of water and other contaminants into the cup 26 while the lips 44, 46, and 52 also allow the flow of lubricant out of the cup 26 when lubricant is supplied to the fitting 20. Annular cavities formed between the lips 40 and 48 and the lips 38 and 40 also tend to trap water and contaminants tending to ingress into the cup. They also trap lubricant tending to egress from the cup with the lubricant so trapped being a further inhibition to the ingress of water and contaminants.

The sealing member 36, in this instance, also has a longer, inwardly and downwardly-extending lip 54 which extends toward and can engage the upper ends of the needle bearings 24 to aid in retaining them in place in the cup, particularly when the cup is separated from the cross 10. The lip 54 also tends to direct lubricant out of the cup between the sealing member 34 and the cylindrical portion 28 of the cup when lubricant is supplied through the fitting 20.

The universal joint cross 10 and the bearing cup 26 are shown in extreme relative positions in FIGS. 3 and 4. In FIG. 3, the bearing cup 26 has maximum dimensions within tolerances and the cross 10 and the trunnion 14 have minimum dimensions within tolerances. The opposite is true in FIG. 4. As discussed before, these variations can result in a spacing variation between the cross and cup of 0.020 inch or more. Further, this amount of spacing variation can occur whether the universal joint is a small one, e.g. having a trunnion diameter of a half inch, or a large one, e.g. having a trunnion diameter of three inches. With the larger universal joints, the sealing members are accordingly larger and can "soak up" or accommodate the dimensional variances rather satisfactorily. However, when the maximum variation in spacing occurs with a smaller universal joint having a smaller seal, the seal cannot properly accommodate such variations, particularly when made of a thermoplastic material.

It has been discovered that this deficiency can be overcome by providing a large, deep, annular groove 56 in the sealing member 36. The groove 56 is located between the upper lip 48 engaging the cross 10 between the trunnion 14 and the cross body 12 and the outwardly-extending lip 46 at the open end of the bearing cup 26. The groove 56 enables the sealing member 36 to flex or yield to a greater extent. This enables the upper lip 48 to yield outwardly when the condition of FIG. 3 exists and also enables the outer lips 44 and 56 to yield inwardly to some extent when the condition of FIG. 4 exists. The annular groove 56 faces outwardly away from the bearing cup 26 and does not inhibit the egress of lubricant from the cup. If the groove 56 were facing into the cup, pressure of the lubricant could force the seal 34 out of its sealing position.

The upper side walls of the groove 56 are substantially parallel to one another and to the extremities of the lips 38, 40, and 44, 46. A bottom portion of the outer side wall of the groove 56 slants inwardly, parallel to the outer surface of the corresponding portion of the sealing member 36. This provides an outer annular portion of the sealing member of uniform cross section to enable the outer lips to yield inwardly more uniformly when there is narrower space between the trunnion and cup, in accordance with the condition shown in FIG. 4.

The groove 56 is located closer to the outer lips 44 and 56 than to the inner lips 38 and 40 to form the sealing member 36 into a thick, sealing body 58 and a much thinner lubricant-escape flap 60. The sealing body 58 forms a complete seal by itself with the oppositely-extending lips 48 and 52 and the inwardly-extending lips 38 and 40. The longer, inwardly- and downwardly-extending lips 54 also is part of the sealing body 58. When the bearing cup is lubricated, excess lubricant can be diverted outwardly by the longer lip 54 and escape past the lip 52 and the outwardly-extending lips 44 and 46 of the flap 60. This prevents a build-up of excess pressure which can pop the seal out of the cup. At the same time, the outer lips 44 and 46 of the flap 60 are effective to prevent contaminants from entering the internal portion 28 of the bearing cup and reaching the lip 52.

Figure 5:
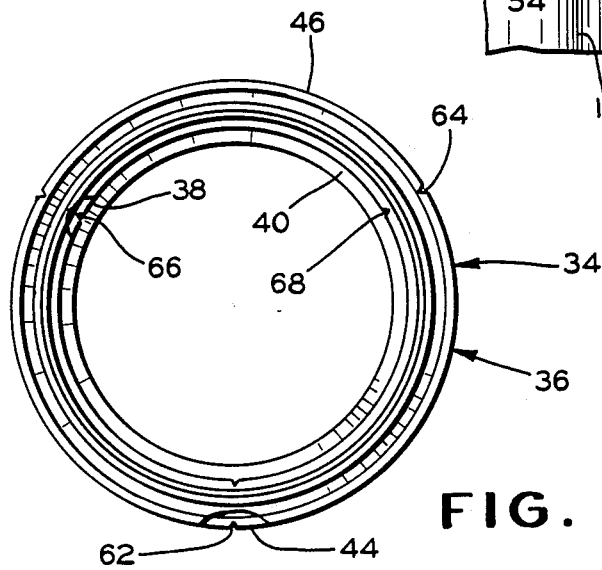
FIG. 5 is a face view in elevation of the universal joint seal with portions broken away.

As shown in FIG. 5, the outer lips 44 can have discontinuities 62 in the form of notches or slits around the periphery. If notches are used, they can be in the shape of a "V", partially circular, or rectangular. The outer lips 46 can have similar discontinuities 64 in the form of notches or slits. At least one of these is located around each of the lips and there can also be at least three of them. The inner lips 38 and 40 can similarly have discontinuities in the form of notches or slits 66 and 68. These enable greater flexing of the lips to enable them to conform more effectively to the associated universal joint component surfaces, particularly when they are eccentric or have irregularities or roughness. The greater flexing enables lubricant to pass more readily out of the cup past the lips 44 and 46 particularly. The discontinuities also act as vents during lubrication.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In combination, a cross having four trunnions and annular shoulders around said trunnions, each of said shoulders lying in a plane substantially perpendicularly to an axis of the associated trunnion, a bearing cup for each of said trunnions, said bearing cup having an open end which receives the associated trunnion, said bearing cup having a first interior portion of circular cross section of one diameter adjacent the open end, said cup having a second interior portion of cylindrical shape of a smaller diameter away from said open end, with an internal shoulder formed between said portions, said cup shoulder lying in a plane substantially perpendicular to an axis of the cup, with the plane of said cross shoulder and the plane of said cup shoulder being substantially parallel, a universal joint seal for each of said bearing cups, said seal comprising a thermoplastic sealing member having a first lip engaging a portion of the associated trunnion shoulder along an annular area, said sealing member having a second lip engaging the cup shoulder along an annular area, said first lip and said second lip extending in substantially opposite directions, said sealing member having multiple inner and outer lips extending inwardly and outwardly and engaging said trunnion and said bearing cup, at least some of said multiple lips having discontinuities in the form of slits or notches extending from outer extremities thereof toward base portions thereof, and said sealing member having a deep, annular groove therein between said first lip and the multiple outer lips and opening away from said bearing cup, said deep annular groove enabling said sealing member to accommodate dimensional variances within tolerances of the spacing between surfaces of the cross and the associated cup, and said deep, annular groove being closer to the multiple outer lips than to the multiple inner lips to form the sealing member into a thick, sealing body having said first and second lips and said multiple inner lips and a much thinner, lubricant-escape flap having the multiple outer lips, said lubricant-escape flap enabling lubricant under pressure to escape from said cup between said flap and said first interior portion of said cup.

2. The combination according to claim 1 characterized by all of said outwardly-extending lips having discontinuities in the form of slits or notches extending from outer extremities thereoof toward base portions thereof.

3. The combination according to claim 1 characterized by all of said inwardly-extending lips having discontinuities in the form of slits or notches extending from outer extremities thereof toward base portions thereof.

4. The combination according to claim 1 characterized by said deep, annular groove being formed, in part, by inner and outer side walls which are parallel to one another and are parallel to the extremities of said multiple lips.

5. The combination according to claim 4 characterized by said deep, annular groove being further formed by a lower slanted wall extending from the outer side wall toward the inner side wall in a direction away from the open end of said bearing cup.

6. The combination according to claim 1 characterized further by said thick, sealing body having a longer, inwardly-and downwardly-extending lip extending toward needle bearings in the associated bearing cup between the bearing cup wall and the associated trunnion.

7. In combination, a cross having four trunnions and annular shoulders around said trunnions, a bearing cup having an open end which receives the trunnion, said bearing cup having a first interior portion of a circular cross section of one diameter adjacent the open end, said cup having a second, cylindrical interior portion of a smaller diameter away from said open end, with an internal shoulder formed between said portions, a universal joint seal for each of said bearing cups, said seal comprising a sealing member having a thick, sealing body and a much thinner, lubricant-escape flap, said sealing member having a deep, annular groove between said sealing body and said lubricant-escape flap, said thick, sealing body having at least two inner lips engaging the associated trunnion along narrow, annular areas, a first lip engaging a portion of the associated trunnion shoulder along an annular area, and a second lip engaging the associated cup shoulder along an annular area, said lubricant-escape flap being joined with said thick, sealing body adjacent said second lip, said flap having at least two outer lips engaging said first interior portion of the associated cup along narrow, annular areas, said lubricant-escape flap enabling lubricant under pressure to escape from said cup between said flap and said first interior portion of said cup, some of said inner and outer lips having discontinuities, each of said lips which have discontinuities having at least three of said discontinuities substantially uniformly spaced around the periphery thereof.

8. The combination according to claim 7 characterized by said first interior portion of said cup being sufficiently deep that substantially only the first lip which engages a portion of the associated trunnion shoulder extends beyond the open end of the associated bearing cup.

9. The combination according to claim 7 characterized by said thick, sealing body having a longer lip extending toward needle bearings located in the associated cup between the cup wall and the associated trunnion, said longer lip serving to direct lubricant in the cup toward said lubricant-escape flap.

10. In combination, a cross having a body and four trunnions extending outwardly therefrom, a bearing cup for each of said trunnions, said bearing cup having an open end which receives the trunnion, said bearing cup having an internal annular shoulder facing toward the open end of the cup, a seal comprising a sealing member having a first lip engaging a portion of the associated trunnion at said cross body and at least two inwardly-extending lips engaging the associated trunnion along annular areas, said sealing member having a second lip extending in a direction generally opposite to said first lip and engaging the associated bearing cup shoulder along an annular area, said sealing member having at least two outwardly-extending lips engaging the interior of the associated bearing cup between the bearing cup shoulder and the open end of the cup along annular areas, said sealing member having a deep, annular groove between said first lip and the closer one of the outwardly-extending lips with said groove opening outwardly away from the associated bearing cup, said deep groove enabling said sealing member to accommodate dimensional variances within tolerances of the spacing between surfaces of the cross and the associated cup, said deep groove being closer to the outwardly-extending lips than to the inwardly-extending lips to form the sealing member into a thick, sealing body having said first and second lips and said inwardly-extending lips, and a much thinner, lubricant-escape flap having the outwardly-extending lips, said thick, sealing body having a longer lip extending toward needle bearings located in the associated cup between the cup wall and the associated trunnion, said longer lip serving to direct lubricant in the cup toward said lubricant-escape flap, and said lubricant-escape flap enabling lubricant under pressure to escape from said cup between said flap and said interior of said cup, at least one of said inwardly- and outwardly-extending lips having discontinuities in the form of slits or notches extending from outer extremities thereof toward base portions thereof, said discontinuities enabling lubricant to pass more readily out of the associated cup and enabling the lips with the discontinuities to conform more effectively with surfaces of the associated trunnion and cup, even when those surfaces are eccentric or have irregularities or roughness.

11. The combination according to claim 10 characterized by all of said outwardly-extending lips having discontinuities in the form of slits or notches extending from outer extremities thereof toward base portions thereof.

12. The combination according to claim 10 characterized by said deep, annular groove being formed, in part, by inner and outer side walls which are parallel to one another and are parallel to the extremities of said inwardly- and outwardly-extending lips.

13. The combination according to claim 12 characterized by said deep, annular groove being further formed by a lower slanted wall extending from the outer side wall toward the inner side wall in a direction away from the open end of said bearing cup.

* * * * *